US010164257B2

(12) United States Patent
Otsuka et al.

(10) Patent No.: US 10,164,257 B2
(45) Date of Patent: Dec. 25, 2018

(54) NEGATIVE ELECTRODE MATERIAL FOR LITHIUM-ION BATTERY, AND USE THEREFOR

(71) Applicants: SHOWA DENKO K.K., Tokyo (JP); UMICORE, Brussels (BE)

(72) Inventors: Yasunari Otsuka, Tokyo (JP); Hirokazu Murata, Tokyo (JP)

(73) Assignees: SHOWA DENKO K.K., Tokyo (JP); UMICORE, Brussels (BE)

( * ) Notice: Subject to any disclaimer, the term of this patent is extended or adjusted under 35 U.S.C. 154(b) by 254 days.

(21) Appl. No.: 15/304,580

(22) PCT Filed: Apr. 16, 2015

(86) PCT No.: PCT/JP2015/061655
§ 371 (c)(1),
(2) Date: Oct. 17, 2016

(87) PCT Pub. No.: WO2015/159935
PCT Pub. Date: Oct. 22, 2015

(65) Prior Publication Data
US 2017/0040610 A1 Feb. 9, 2017

(30) Foreign Application Priority Data

Apr. 16, 2014 (JP) .................................. 2014-084944

(51) Int. Cl.
| | | |
|---|---|---|
| *H01M 4/58* | (2010.01) | |
| *H01M 4/587* | (2010.01) | |
| *H01M 4/36* | (2006.01) | |
| *H01M 4/38* | (2006.01) | |
| *H01M 4/133* | (2010.01) | |
| *H01M 4/62* | (2006.01) | |
| *H01M 10/0525* | (2010.01) | |
| *H01M 4/02* | (2006.01) | |

(52) U.S. Cl.
CPC ........... *H01M 4/587* (2013.01); *H01M 4/133* (2013.01); *H01M 4/36* (2013.01); *H01M 4/366* (2013.01); *H01M 4/38* (2013.01); *H01M 4/58* (2013.01); *H01M 4/621* (2013.01); *H01M 10/0525* (2013.01); *H01M 2004/027* (2013.01)

(58) Field of Classification Search
CPC ........ H01M 4/587; H01M 4/133; H01M 4/36; H01M 4/366; H01M 4/38; H01M 4/58; H01M 4/621; H01M 10/052; H01M 10/0525; H01M 2004/027
See application file for complete search history.

(56) References Cited

U.S. PATENT DOCUMENTS

| | | |
|---|---|---|
| 2002/0192555 A1 | 12/2002 | Teshima et al. |
| 2004/0033419 A1 | 2/2004 | Funabiki |
| 2008/0166634 A1 | 7/2008 | Kim et al. |
| 2009/0047577 A1 | 2/2009 | Iwamoto et al. |
| 2011/0024676 A1 | 2/2011 | Kim et al. |
| 2011/0244333 A1* | 10/2011 | Kawada ................ H01M 4/131 429/231.8 |
| 2012/0009452 A1* | 1/2012 | Ueda ...................... H01M 4/13 429/94 |
| 2012/0208083 A1 | 8/2012 | Ati et al. |
| 2013/0115517 A1* | 5/2013 | Kim ....................... H01M 4/134 429/231.8 |
| 2013/0224600 A1* | 8/2013 | Yasuda ................. H01G 11/50 429/231.8 |
| 2015/0325848 A1 | 11/2015 | Yamashita et al. |

FOREIGN PATENT DOCUMENTS

| | | |
|---|---|---|
| EP | 2 481 111 | 8/2012 |
| JP | 2002-231225 A | 8/2002 |
| JP | 2002-324550 A | 11/2002 |
| JP | 2004-71542 A | 3/2004 |
| JP | 2004-259475 A | 9/2004 |
| JP | 2008-112710 A | 5/2008 |
| JP | 2008-270199 A | 11/2008 |
| WO | 2007/063765 A1 | 6/2007 |
| WO | 2011/035876 A1 | 3/2011 |
| WO | 2014/007161 A1 | 1/2014 |

OTHER PUBLICATIONS

International Search Report for PCT/JP2015/061655 dated Jul. 14, 2015.
Communication dated Oct. 12, 2017 from the European Patent Office in counterpart application No. 15779473.6.

* cited by examiner

*Primary Examiner* — Raymond Alejandro
(74) *Attorney, Agent, or Firm* — Sughrue Mion, PLLC

(57) ABSTRACT

A negative electrode material for a lithium ion battery containing a composite material, the composite material including silicon-containing particles, graphitic carbon material particles, and a carbonaceous carbon material, in which the composite material has a ratio (A/B) of an area (A) of a peak near 100 eV derived from metal Si to an area (B) of a peak near 103 eV derived from silicon oxide, as measured by XPS, of not less than 0.10 and not more than 2.30. Also disclosed is a paste including the negative electrode material, as well as a negative electrode for a lithium ion battery including a formed body of the paste and a lithium ion battery including the negative electrode.

15 Claims, No Drawings

NEGATIVE ELECTRODE MATERIAL FOR LITHIUM-ION BATTERY, AND USE THEREFOR

CROSS REFERENCE TO RELATED APPLICATIONS

This application is a National Stage of International Application No. PCT/JP2015/061655 filed Apr. 16, 2015, claiming priority based on Japanese Patent Application No. 2014-084944 filed Apr. 16, 2014, the contents of all of which are incorporated herein by reference in their entirety.

TECHNICAL FIELD

The present invention relates to a negative electrode material for lithium ion battery and use thereof. More specifically, the present invention relates to a negative electrode material from which a lithium ion battery having large initial charge and discharge efficiency, large charge and discharge capacity, and excellent charge and discharge cycle characteristics can be obtained, a paste comprising the negative electrode material, a negative electrode comprising a formed body of the paste, and a lithium ion battery comprising the negative electrode.

BACKGROUND ART

A graphite is generally used as a negative electrode material for lithium ion battery. Theoretical capacity of the graphite is 372 mAh/g. Theoretical capacity of Si and Sn is higher than that of the graphite, and therefore if Si or Sn can be used as the negative electrode material, a lithium ion battery having high capacity can be provided. However, particles containing Si or Sn originally have low electric conductivity and also a volume change associated with intercalation and deintercalation of lithium ions is large, and therefore the particles are broken and an electrically conducting path comes to a disconnection, leading to an increase in internal resistance. Thus, various proposals have been made on composite materials composed of a carbon material and Si particles complexed with the carbon material.

For example, Patent Literature 1 proposes a negative electrode material for lithium secondary battery, in which the negative electrode material is composed of silicon particles and a carbon precursor, a coating layer composed of a non-graphitic carbon material is formed on a surface of the silicon particles, and a peak intensity ratio of silicon to carbon in X-ray photoelectron spectroscopy (ESCA) is 0 to 0.2.

Patent Literature 2 proposes a negative electrode material for lithium ion secondary battery, in which the negative electrode material comprises particles composed of silicon and carbon-coating layer on a surface of the particles, an average particle size of core particles is not less than 5 nm and not more than 100 nm, and an area of a peak near 104 eV derived from silicon oxide is smaller than 25% of a sum of areas of peaks near 100 eV derived from silicon and silicon-carbon in X-ray photoelectron spectroscopy.

Patent Literature 3 discloses a negative electrode material for lithium secondary battery, in which the negative electrode material comprises Si particles having an average particle size of 0.05 to 5 μm and several types of carbonaceous material, and an oxygen content of not more than 5% by weight.

Patent Literature 4 proposes a composite electrode material, in which the composite electrode material comprises graphite particles, amorphous carbon and silicon, and has a silicon content in terms of $SiO_2$ of 40 to 80% by weight, true density of $1.8 \times 10^3$ kg/m$^3$ or more, tap density of $0.8 \times 10^3$ kg/m$^3$ or more, and a specific surface area of $8 \times 10^3$ m$^2$/kg or less, and has one peak near 102.5 to 107.5 eV in a Si2P spectrum in XPS.

CITATION LIST

Patent Literature

Patent Literature 1: JP 2004-259475 A
Patent Literature 2: WO 2014/007161 A1
Patent Literature 3: JP 2008-112710 A
Patent Literature 4: JP 2002-231225 A

SUMMARY OF THE INVENTION

Problems to be Solved by the Invention

The object of the present invention is to provide a negative electrode material that is capable of giving a lithium ion battery having large initial charge and discharge efficiency and large charge and discharge capacity and excellent charge and discharge cycle characteristics, a paste comprising the negative electrode material, a negative electrode comprising a formed body of the paste, and a lithium ion battery comprising the negative electrode.

Means for Solving the Problems

In order to achieve the object, a research was diligently conducted. As the result, completed has been the present invention including the embodiments as below.
[1] A negative electrode material for lithium ion battery, the negative electrode material comprising a composite material, wherein the composite material comprises silicon-containing particles, graphitic carbon material particles and a carbonaceous carbon material, and has a ratio (A/B) of an area (A) of a peak near 100 eV derived from metal Si to an area (B) of a peak near 103 eV derived from silicon oxide, as measured by X-ray photoelectron spectroscopy (XPS), of not less than 0.10 and not more than 2.30.
[2] The negative electrode material for lithium ion battery according to [1], wherein an oxygen content of the composite material is not more than 3% by mass.
[3] The negative electrode material for lithium ion battery according [1] or [2], wherein a BET specific surface area of the composite material is not less than 2 m$^2$/g and not more than 22 m$^2$/g.
[4] The negative electrode material for lithium ion battery according to any one of [1] to [3], wherein a 10% diameter ($D_{10}$) in a volume-based cumulative particle size distribution of the composite material, as measured by a laser diffraction method, is not less than 2.0 μm.
[5] The negative electrode material for lithium ion battery according to any one of [1] to [4], wherein the silicon-containing particles comprise a surface layer comprising $SiO_x$ (0<x≤2), and has a 90% diameter ($D_{90}$) of not more than 200 nm in a number-based cumulative primary particle size distribution.
[6] The negative electrode material for lithium ion battery according to any one of [1] to [5], wherein an amount of the silicon-containing particles is not less than 5 parts by mass and not more than 35 parts by mass relative to 100 parts by mass of the graphitic carbon material particles.

[7] The negative electrode material for lithium ion battery according to any one of [1] to [6], wherein an oxygen content of the silicon-containing particles is not less than 1% by mass and not more than 18% by mass.

[8] The negative electrode material for lithium ion battery according to any one of [1] to [7], wherein the graphitic carbon material particles are composed of artificial graphite.

[9] The negative electrode material for lithium ion battery according to any one of [1] to [8], wherein the graphitic carbon material particles are in a shape of a scale, and have an average interplanar distance ($d_{002}$) of (002) plane of not more than 0.337 nm and a crystallite size (Lc) of not less than 50 nm and not more than 1000 nm as calculated by analysis of an X-ray diffraction pattern with CuKα radiation.

[10] The negative electrode material for lithium ion battery according to any one of [1] to [9], wherein the carbonaceous carbon material comprises a heat-treated product of petroleum pitch or coal pitch.

[11] The negative electrode material for lithium ion battery according to [10], wherein a softening point of the petroleum pitch or the coal pitch is 80° C. to 300° C.

[12] The negative electrode material for lithium ion battery according to any one of [1] to [11], wherein an amount of the carbonaceous carbon material is not less than 2% by mass and not more than 40% by mass relative to mass of the composite material.

[13] A paste, comprising the negative electrode material for lithium ion battery according to any one of [1] to [12], and a binder.

[14] A negative electrode for lithium ion battery, comprising a formed body of the paste according to [13].

[15] A lithium ion battery, comprising the negative electrode according to [14].

Advantageous Effects of the Invention

A negative electrode material for lithium ion battery according to the present invention has low initial irreversible capacity and a large discharge amount per mass. Moreover, using of the negative electrode material can give a lithium ion battery having large initial charge and discharge efficiency and large charge and discharge capacity and excellent charge and discharge cycle characteristics.

A reason why an effect as described above is obtained by the negative electrode material for lithium ion battery according to the present invention has not been known yet, but such a matter can be described in terms of phenomena. The ratio (A/B) of an area (A) of a peak near 100 eV derived from metal Si to an area (B) of a peak near 103 eV derived from silicon oxide, as measured by XPS, is considered to represent a degree of oxidization of Si. More specifically, the silicon-containing particles composing the negative electrode material according to the present invention is presumed to have a low degree of oxidization and a small proportion of a carbon-silicon bond formed by silicon and carbon. As in the composite materials described in Patent Literature 1 and 3, milling of Si particles using a ball mill or a beads mill easily promotes oxidization of the surface of Si particles, resulting in a small peak area ratio A/B. Silicon oxide has low electrical conductivity. If a content of silicon oxide decreases, a trend of reduced initial irreversible capacity or the like is caused. In the composite material described in Patent Literature 2, the carbon-silicon bond is formed. Silicon carbide is inactive to Li ions and causes no contribution to charge and discharge, and therefore reduction of the carbon-silicon bond presumably tends to improve capacity retention ratio.

EMBODIMENTS FOR CARRYING OUT THE INVENTION

A negative electrode material for lithium ion battery according to one embodiment of the present invention comprises a composite material comprising silicon-containing particles, graphitic carbon material particles, and a carbonaceous carbon material.

[Silicon-Containing Particles]

The silicon-containing particles, to be used in the negative electrode material according to the present invention, preferably comprise a surface layer comprising $SiO_x$ ($0<x\leq2$). A part other than the surface layer, that is core, may be composed of elemental silicon or $SiO_x$ ($0<x\leq2$). An average thickness of the surface layer comprising $SiO_x$ is preferably not less than 0.5 nm and not more than 10 nm. If the average thickness of the surface layer comprising $SiO_x$ is 0.5 nm or more, oxidization by air or oxidizing gas can be suppressed. Moreover, if the average thickness of the surface layer comprising $SiO_x$ is 10 nm or less, an increase in irreversible capacity during an initial cycle can be suppressed. The average thickness can be measured on a TEM photograph.

The silicon-containing particles, to be used in the negative electrode material according to the present invention, have an oxygen content of preferably not less than 1% by mass and not more than 18% by mass, and further preferably not less than 2% by mass and not more than 10% by mass. If the oxygen content is within the range, the increase in the irreversible capacity during the initial cycle can be suppressed. The oxygen content can be quantitatively determined by an oxygen and nitrogen simultaneous analyzer (inert gas fusion-infrared absorption method), for example.

The silicon-containing particles, to be used in the negative electrode material according to the present invention, have a 90% diameter ($D_{90}$) of preferably 200 nm or less in a number-based cumulative primary particle size distribution. The primary particle size can be measured through observation by use of a microscope such as SEM or TEM. Moreover, the primary particle size of the silicon-containing particles in the composite material can be calculated by performing image analysis of an image of spherical particles observed on a surface coating layer of the composite material by using a transmission electron microscope having a magnification of 100,000.

Moreover, the silicon-containing particles, to be used in the negative electrode material according to the present invention, have a diameter ($D_{av}$) defined by the following formula of preferably not less than 30 nm and not more than 150 nm, and further preferably not less than 30 nm and not more than 120 nm:

$$D_{av}=6/(\rho \times S_{sa}),$$

$D_{av}$ denotes a diameter on the assumption that the particles are dense spheres;

$S_{sa}$ denotes a BET specific surface area of the silicon-containing particles ($m^2/g$); and $\rho$ denotes a true density of silicon (2.33 $g/cm^3$ as a theoretical value).

By keeping the diameter $D_{av}$ within the range, volume strain accompanying intercalation of Li into a Si crystal phase can be relaxed, and expansion and contraction accompanying charge and discharge, which is the largest disadvantage when Si is used in a negative electrode active material, can be suppressed.

The silicon-containing particles, to be used in the negative electrode material according to the present invention, can contain an element M selected from other metal elements and metalloid elements (for example, a carbon element) in the particles, in addition to silicon. Specific examples of the element M include nickel, coper, iron, tin, aluminum, cobalt and the like. A content of the element M is not particularly limited, so long as an action of silicon is not adversely affected, and for example, the amount is one mol or less relative to one mole of a silicon atom.

The silicon-containing particles, to be used in the negative electrode material according to the present invention, are not particularly limited by a production method thereof. For example, the silicon-containing particles can be produced by a method described in WO 2012/000858 A.

The amount of the silicon-containing particles comprised in the composite material according to the present invention is preferably not less than 5 parts by mass and not more than 40 parts by mass, further preferably not less than 5 parts by mass and not more than 35 parts by mass, and still further preferably not less than 7 parts by mass and not more than 34 parts by mass relative to 100 parts by mass of graphitic carbon material particles. When the amount of silicon-containing particles is small, an effect of improving battery capacity by adding the silicon-containing particles tends to be poor. When the amount of silicon-containing particles is large, a volume change accompanying intercalation and deintercalation of lithium ions tends to be increased.

[Graphitic Carbon Material Particles]

The graphitic carbon material particles, to be used in the negative electrode material according to the present invention, are particles formed of a graphitic carbon material and preferably artificial graphite particles. The graphitic carbon material is a carbon material in which a crystal formed of a carbon atom is significantly developed. The graphitic carbon material is a carbon material which is more lubricative and softer, and has a lower scratch strength than the carbonaceous carbon material. The graphitic carbon material particles flexibly move in connection with pressing during preparing an electrode, which contributes to an improvement in electrode density.

The graphitic carbon material particles, to be used in the negative electrode material according to the present invention, are preferably scale-like particles. The graphitic carbon material particles have a 50% diameter ($D_{50}$) in a volume-based cumulative particle size distribution of preferably not less than 1 μm and not more than 50 μm, further preferably not less than 5 μm and not more than 35 μm, and still further preferably not less than 10 μm and not more than 25 μm. If $D_{50}$ is 1 μm or more, a side reaction is hard to occur during charge and discharge, and if $D_{50}$ is 50 μm or less, a diffusion speed of lithium ions in the negative electrode material tends to increase and a rate of charge and discharge tends to improve. In case of an application to a driving power source for an automobile or the like which requires large current generation, $D_{50}$ is preferably 25 μm or less. $D_{50}$ is measured using a laser diffraction particle size analyzer, for example, Mastersizer (registered trademark) made by Malvern Instruments Ltd.

The graphitic carbon material particles, to be used in the negative electrode material according to the present invention, have an average interplanar distance ($d_{002}$) of (002) plane as calculated through analysis of an X-ray diffraction pattern with CuKα radiation of preferably 0.337 nm or less.

As $d_{002}$ is smaller, the amount of intercalation and deintercalation of lithium ions per mass increases, which therefore contributes to an improvement in weight energy density. In addition, if $d_{002}$ is 0.337 nm or less, optical textures observed by a polarization microscope are almost optical anisotropic textures.

Moreover, the graphitic carbon material particles, to be used in the negative electrode material according to the present invention, have a thickness (Lc) in a crystal C axis direction of the graphitic carbon material as calculated through analysis of an X-ray refraction pattern with CuKα radiation, of preferably not less than 50 nm and not more than 1000 nm. The graphitic carbon material particles having a large Lc is preferred in view of improving energy density of the battery per volume. From a viewpoint of improving energy density per volume, Lc is preferably not less than 80 nm and not more than 300 nm, further preferably not less than 100 nm and not more than 200 nm, and still further preferably not less than 100 nm and not more than 150 nm. When Lc is small, such particles are advantageous in view of maintaining the battery cycle characteristics. From a viewpoint of maintaining the battery cycle characteristics, Lc is preferably not less than 50 nm and not more than 200 nm, further preferably not less than 50 nm and not more than 100 nm, and still further preferably not less than 50 nm and not more than 90 nm.

In addition, $d_{002}$ and Lc can be determined by a powder X-ray diffraction (XRD) method (refer to Inayoshi Noda and Michio Inagaki, Japan Society for the Promotion of Science, $117^{th}$ Committee materials, 117-71-A-1 (1963), Michio Inagaki et. al., Japan Society for the Promotion of Science, $117^{th}$ Committee materials, 117-121-C-5 (1972), and Michio Inagaki, "Carbon" 1963, No. 36, pp. 25-34).

The graphitic carbon material particles, to be used in the negative electrode material according to the present invention, have a G value of preferably not less than 5.2 and not more than 100, further preferably not less than 7.0 and not more than 80, and still further preferably not less than 10 and not more than 60. The G value is a ratio ($I_G/I_D$) of an area ($I_G$) of a peak in the range of 1580 to 1620 $cm^{-1}$ to an area ($I_D$) of a peak in the range of 1300 to 1400 $cm^{-1}$ in a spectrum by Raman spectroscopy as observed upon measurement of a particle end face by a microscopic Raman spectrum measuring instrument. If the G value is within the numerical range described above, self-discharge and deterioration of the battery can be suppressed. In addition, if the G value is excessively small, the side reaction tends to occur during charge and discharge due to the existence of many defects.

The spectrum by Raman spectroscopy on the particle end face is measured by selectively observing a part serving as the end face, and not a smooth portion (basal face), by using Laser Raman Spectrometer (NRS-5100, made by JASCO Corporation) and a microscope attached thereto, for example. In the spectrum by Raman spectroscopy on the particle end face, the peak in the range of 1300 to 1400 $cm^{-1}$ is derived from an sp3 bond, and the peak in the range of 1580 to 1620 $cm^{-1}$ is derived from an sp2 bond. As the G value is larger, a proportion of the sp2 bond is suggested to be larger.

The graphitic carbon material particles, to be used in the negative electrode material according to the present invention, have the BET specific surface area of preferably not less than 0.4 $m^2/g$ or more and not more than 5 $m^2/g$, further preferably not less than 0.5 $m^2/g$ and not more than 3.5 $m^2/g$, and still further preferably not less than 0.5 $m^2/g$ and not more than 3.0 $m^2/g$. If the BET specific surface area is within the range, no excessive use of the binder is required, a large area in contact with an electrolytic solution can be ensured, the lithium ions can be smoothly intercalated and deintercalated, and reaction resistance of the battery can be reduced. In addition, the BET specific surface area is calculated from an amount of adsorbed nitrogen gas. Specific examples of a measurement device therefor include NOVA-1200 made by Yuasa Ionics Co., Ltd.

The graphitic carbon material particles, to be used in the negative electrode material according to the present invention, have a loose bulk density (tapped 0 times) of preferably not less than 0.7 g/cm$^3$, and a powder density (tap density) upon being tapped 400 times of preferably not less than 0.8 g/cm$^3$ and not more than 1.6 g/cm$^3$, further preferably not less than 0.9 g/cm$^3$ and not more than 1.6 g/cm$^3$, and still further preferably not less than 1.1 g/cm$^3$ and not more than 1.6 g/cm$^3$.

The loose bulk density is a density obtained by dropping 100 g of a sample to a measuring cylinder from a height of 20 cm and measuring a volume and mass without applying vibration. The tap density is a density obtained by measuring a volume and mass of 100 g of powder tapped 400 times by using Autotap provided by Quantachrome Instruments Japan, G.K. These methods described above are measurement methods according to ASTM B527 or JIS K5101-12-2. A drop height in the Autotap in the tap density measurement is adjusted to 5 mm.

If the loose bulk density is not less than 0.7 g/cm$^3$, the electrode density before being pressed tends to be increased upon coating the powder onto the electrode. Whether or not sufficient electrode density can be obtained by roll pressing one time can be predicted by the value. Moreover, the electrode density to be reached during pressing is easily adjusted to a desired level by keeping the tap density within the range described above.

The graphitic carbon material particles, to be used in the negative electrode material according to the present invention are not particularly limited by the production method therefor. For example, the graphitic carbon material particles can be produced by a method disclosed in WO 2014/003135 A.

As a raw material of the graphitic carbon material particles, coal coke and/or petroleum coke can be used. The graphitic carbon material particles are produced by subjecting the coal coke and/or the petroleum coke to a heat treatment at a temperature of preferably 2000° C. or higher, and further preferably 2500° C. or higher. An upper limit of the temperature of the heat treatment is not particularly limited, but 3200° C. is preferable. The heat treatment described above is preferably conducted under an inert atmosphere. The heat treatment can be conducted by using an Acheson type graphitization furnace, for example.

The amount of the graphitic carbon material particles is preferably 20 to 96% by mass, and further preferably 40 to 92% by mass, based on mass of the composite material.

[Carbonaceous Carbon Material]

The carbonaceous carbon material, to be used in the negative electrode material according to the present invention, is a carbon material in which development of a crystal formed by the carbon atom is low. The carbonaceous carbon material can be produced by carbonizing a carbon precursor, for example. The carbon precursor is not particularly limited, but is preferably hot heavy oil, thermally cracked oil, straight asphalt, blown asphalt, a material derived from petroleum such as tar or petroleum pitch by-produced during ethylene production, coal tar produced during coal distillation, a heavy component obtained by distilling coal tar to remove a low-boiling component, or a material derived from coal such as coal tar pitch (coal pitch), and is further preferably petroleum pitch or coal pitch. The pitch is a mixture of a plurality of polycyclic aromatic compounds. Using of the pitch can produce the carbonaceous carbon material having little impurities with a high carbonization ratio. The pitch has a small oxygen content, and therefore the silicon-containing particles are hard to be oxidized upon covering the silicon-containing particles with the carbonaceous carbon material.

The pitch as the precursor of the carbonaceous carbon material has a softening point of preferably not less than 80° C. and not more than 300° C. The pitch having an excessively low softening point has a small average molecular weight of the polycyclic aromatic compound constituting the pitch and a high content of volatile matters, and therefore the carbonization ratio is reduced, production cost increases, or further the carbonaceous carbon material having a large amount of pores and a large specific surface area is easily obtained. The pitch having an excessively high softening point has a high viscosity, and therefore it tends to be hardly mixed with the silicon-containing particles uniformly. The softening point of the pitch can be measured by a Mettler Method described in ASTM D3104-77.

The pitch as the precursor of the carbonaceous carbon material has a residual carbon ratio of preferably not less than 20% by mass and not more than 70% by mass, and further preferably not less than 25% by mass and not more than 60% by mass. If the pitch having a low residual carbon ratio is used, the production cost increases, and the carbonaceous carbon material having a large specific surface area is easily obtained. The pitch having a high residual carbon ratio generally has high viscosity, and therefore it tends to be hardly mixed with the silicon-containing particles uniformly.

The residual carbon ratio is determined by a method described below. Solid pitch is ground with a mortar or the like, and the ground material is subjected to mass and thermal analysis under flow of nitrogen gas. A proportion of mass at 1100° C. to charged mass is defined as the residual carbon ratio. The residual carbon ratio corresponds to a fixed carbon content as measured at a carbonization temperature of 1100° C. in JIS K2425.

The pitch to be used in the present invention has a QI (quinolone-insoluble) content of preferably not more than 10% by mass, further preferably not more than 5% by mass, and still further preferably not more than 2% by mass. The QI content of the pitch is a value corresponding to an amount of free carbon. If the pitch containing a large amount of free carbon is subjected to heat treatment, in a process where a mesophase sphere appears, the free carbon adheres onto a surface of the mesophase sphere to form a three-dimensional network, which inhibits growth of the sphere, and therefore the pitch is easily formed into a mosaic texture. On the other hand, if the pitch having a small amount of free carbon is subjected to heat treatment, the mesophase sphere significantly grows to easily produce needle coke. The electrode characteristics become further favorable by keeping the QI content within the range described above.

The pitch used in the present invention has a TI (toluene-insoluble) content of preferably not less than 10% by mass and not more than 70% by mass. The pitch having a low TI content has a small average molecular weight of the polycyclic aromatic compound constituting the pitch, and a high content of volatile matters, and therefore a carbonization ratio is reduced and the production cost increases, and therefore the carbonaceous carbon material having a large amount of pores and having a large specific surface area is easily obtained. The pitch having a high TI content has a large average molecular weight of the polycyclic aromatic compounds composing the pitch, and therefore the carbonization ratio increases. However, the pitch having the high TI content has high viscosity, and therefore it tends to be hardly mixed with the silicon-containing particles uniformly. The pitch and other components can be uniformly mixed by keeping the TI content within the range described above, and the composite material having preferable characteristics as an active material for the battery can be obtained.

The QI content and the TI content of the pitch used in the present invention can be measured according to a method described in JIS K2425 or a method based thereon.

The amount of carbonaceous carbon material, based on the mass of the composite material, is preferably 2% by mass, further preferably 4% by mass, and still further preferably 5% by mass in the lower limit thereof, and is preferably 40% by mass, and further preferably 30% by mass in the upper limit thereof.

In the composite material according to the present invention, the silicon-containing particles and the graphitic carbon material particles are preferably linked by the carbonaceous carbon material. The linking can improve conductivity between the graphitic carbon material particles and between the silicon-containing particles, respectively, and can buffer the volume change accompanying expansion and contraction.

The composite material according to the present invention has the ratio (A/B) of the area (A) of the peak near 100 eV derived from metal Si to the area (B) of the peak near 103 eV derived from silicon oxide, as observed in the XPS measurement, of ordinarily not less than 0.10 and not more than 2.30, preferably not less than 0.10 and not more than 1.70, further preferably not less than 0.10 and not more than 1.50, and still further preferably not less than 0.10 and not more than 1.30. The peak area ratio A/B is considered to indicate an inhibition degree of oxidization of the silicon-containing particles. When the peak area ratio (A/B) is large, the oxidization is suppressed, and the $SiO_x$ surface layer ($0 < x \leq 2$) of the silicon-containing particles is considered to be thin.

In addition, XPS (X-ray Photoelectron Spectroscopy, also called ESCA (Electron Spectroscopy for Chemical Analysis) is well known as a method for analyzing a surface of a material. The peak area ratio (A/B) described above is measured under conditions described below and calculated.

Measuring device: X-ray Photoelectron Spectrometry (Quantera II) made by ULVAC-PHI, Inc.

X-ray source: Al monochrome 100 μm, 25 W, 15 KV

Analysis area: 100 μmφ

Surface etching: None

Electron-ion neutralizing gun: ON

Photoelectron take-off angle: 45°

A sample for measurement is pressed on an aluminum dish (5 mmφ) and attached to a sample base (material: Cr plated-aluminum alloy) with a double-sided adhesive tape. Al is not detected from measured data, and therefore it can be judged that a signal of only the sample for measurement is detected. In addition, in bond energy correction, a C-C peak in a C1s spectrum is adjusted to 284.6 eV.

Moreover, the composite material according to the present invention has a full width at half maximum of 111 diffraction peak derived from silicon, as observed in the X-ray diffraction with CuKα radiation, of preferably 0.3° to 0.5° in terms of a scatter angle (2θ). If the full width at half maximum on the (111) plane is within the range, a balance between cycle retention rate and initial charge and discharge efficiency is improved. Moreover, from a viewpoint of improving the cycle retention rate in the lithium ion battery, the full width at half maximum of the 111 diffraction peak is preferably 0.3° or more, further preferably 0.5° or more, and still further preferably 0.7° or more in terms of the scatter angle (2θ). From a viewpoint of improving the initial charge and discharge efficiency in the lithium ion battery, the full width at half maximum of the 111 diffraction peak is preferably 0.5° or less, further preferably 0.3° or less, and still further preferably 0.2° or less in terms of the scatter angle (2θ).

The composite material according to the present invention has the BET specific surface area of preferably not less than 2 $m^2/g$ and not more than 22 $m^2/g$, further preferably not less than 3 $m^2/g$ and not more than 22 $m^2/g$, and still further preferably not less than 4.7 $m^2/g$ and not more than 22.0 $m^2/g$, still further preferably 5.0 $m^2/g$ to 15.0 $m^2/g$, and particularly preferably 5.0 $m^2/g$ to 11.0 $m^2/g$.

The composite material according to the embodiment of the present invention has the 10% diameter ($D_{10}$) in the volume-based cumulative particle size distribution as measured by a laser diffraction method of preferably nor less than 2.0 μm, further preferably not less than 2.5 μm, and still further preferably not less than 3.0 μm or more. If $D_{10}$ is excessively small, binding force between the negative electrode material and a current collector tends to decrease to cause a problem in which the negative electrode material is peeled off upon charge and discharge. An upper limit of $D_{10}$ can be appropriately set based on a relationship with a thickness of the electrode.

The composite material according to the present invention has the oxygen content of preferably 3% by mass or less, further preferably 3.0% by mass or less, still further preferably 2.0% by mass or less, and particularly preferably 1.7% by mass or less. The oxygen content can be quantitatively determined by an oxygen-nitrogen simultaneous analyzer (inert gas fusion-infrared absorption method), for example.

[Production Method]

The production method of the composite material according to the present invention is not particularly limited, so long as the composite material has characteristic values as described above. The composite material can be obtained, for example, by a method comprising mixing the silicon-containing particles, the graphitic carbon material particles and the precursor of the carbonaceous carbon material, and subjecting the resultant mixture to heat treatment to form the precursor into the carbonaceous carbon material.

The mixture of the silicon-containing particles, the graphitic carbon material particles, and the carbon precursor can be obtained by: fusing pitch being one of carbon precursors, mixing the fused pitch and the silicon-containing particles under an inert atmosphere, milling the resultant mixture, and mixing the resultant ground material with the graphitic carbon material particles; mixing the silicon-containing particles and the graphitic carbon material particles, mixing the resultant mixture of the silicon-containing particles and the graphitic carbon material particles with the carbon precursor, and then subjecting the mixture to mechanochemical processing; or dissolving the carbon precursor by a appropriate method, mixing the silicon-containing particles and the graphitic carbon material particles in the resultant liquid phase, and then milling the resultant particles, for example. In the mechanochemical processing, a publicly known device such as Hybridizer (registered trademark) made by Nara Machinery Co., Ltd. or the like can be employed.

For milling and mixing, a publicly known device such as a ball mill, a jet mill, a rod mill, a pin mill, a rotary cutter mill, a hammer mill, an atomizer, a mortar or the like can be used. Such a milling or mixing method according to which an oxidization degree of the silicon-containing particles is not increased is preferably applied. Oxidization is generally considered to further progress in smaller sized particles having a larger specific surface area, and therefore a device is further preferably used in which milling of large sized particles preferentially progresses, and milling of small sized-particles does not significantly progress. For example, a means for milling mainly by impact, such as the rod mill and the hammer mill, impact power tends to be preferentially transmitted to the large sized particles and not significantly transmitted to the small sized particles. In a means for milling mainly by impact and shear, such as the pin mill and rotary cutter mill, the shearing force tends to be preferentially transmitted to the large sized particles and not significantly transmitted to the small sized particles. The composite material according to the present invention can be obtained by operation of milling and mixing, without causing progress of oxidization of the silicon containing particles, using such a device.

The milling and mixing are conducted preferably under a non-oxidizing atmosphere in order to suppress progress of oxidization of Si. Specific examples of the non-oxidizing atmosphere include an atmosphere in which inert gas such as argon gas, nitrogen gas or the like is filled.

The heat treatment for forming the carbon precursor into the carbonaceous carbon material is performed at a temperature of preferably not less than 200° C. and not more than 2000° C., further preferably not less than 500° C. and not more than 1500° C., and particularly preferably not less than 600° C. and not more than 1300° C. The heat treatment results in covering the silicon-containing particles and/or the graphitic carbon material particles with the carbonaceous carbon material, and introducing the carbonaceous carbon material into spaces between the silicon-containing particles, between the graphitic carbon material particles, and between the silicon-containing particles and the graphitic carbon material particles, to link therewith. If the heat treatment temperature is excessively low, carbonization of the carbon precursor is not sufficiently terminated and hydrogen or oxygen remains in the composite material to adversely affect battery characteristics in several cases. In contrast, if the heat treatment temperature is excessively high, crystallization excessively progresses to cause reduction of charge characteristics or cause binding of silicon and carbon to produce a state inactive to Li ions in several cases. The heat treatment is preferably conducted under the non-oxidizing atmosphere. Specific examples of the non-oxidizing atmosphere include an atmosphere in which inert gas such as argon gas and nitrogen gas is filled. The particles may be formed into lump by fusion during the heat treatment, and therefore the lump is preferably disintegrated in order to use the heat-treated product as an electrode active material. As a disintegration method, a pulverizer using impact force of a hammer or the like or a jet mill using collision of the integrated material with each other.

The negative electrode material for lithium ion battery according to the present invention may independently contain graphitic carbon material particles, a carbonaceous carbon material, or silicon-containing particles which are not formed into a composite, in addition to the composite material as described above. The amount of the graphitic carbon material particles, the carbonaceous carbon material, or the silicon-containing particles independently contained without being formed into the composite is preferably small, and specifically is preferably 10% by mass or less relative to the mass of the negative electrode material.

(Paste for Negative Electrode)

A paste for negative electrode according to one embodiment of the present invention comprises the negative electrode material, a binder, a solvent, and when necessary, a conductive assistant. The paste for negative electrode is obtained by kneading the negative electrode material, the binder, and the solvent, and when necessary, the conductive assistant, for example. The paste for negative electrode can be formed into a shape of sheet or pellet.

Specific examples of the binder include polyethylene, polypropylene, an ethylene-propylene terpolymer, a butadiene rubber, a styrene-butadiene rubber, a butyl rubber, a acryl rubber, a polymer compound having large ion conductivity or the like. Specific examples of the polymer compound having large ion conductivity include polyvinylidene fluoride, polyethylene oxide, polyepichlorohydrin, polyphosphazene, polyacrylonitrile or the like. The amount of the binder is preferably not less than 0.5 parts by mass and not more than 100 parts by mass relative to 100 parts by mass of the negative electrode material.

The conductive assistant is not particularly limited, so long as conductivity and electrode stability (cushioning action on the volume change in insertion and desorption of lithium ions) were provided to the electrode. Specific examples thereof include carbon nanotube, carbon nanofiber, vapor grown carbon fiber (for example, "VGCF" (registered trademark), made by Showa Denko, K.K.), and conductive carbon (for example, "DENKA BLACK (registered trademark) made by Denka Co., Ltd., "Super C65" made by TIMCAL Ltd., "Super S45" made by TIMCAL Ltd., and "KS6L" made by TIMCAL Ltd). The amount of the conductive assistant is preferably not less than 10 parts by mass and not more than 100 parts by mass relative to 100 parts by mass of the negative electrode material.

The solvent is not particularly limited, and specific examples thereof include N-methyl-2-pyrrolidone, dimethylformamide, isopropanol, water and the like. In the case of the binder in which water is used as the solvent, a thickener is preferably used in combination therewith. The amount of the solvent is adjusted so as to have viscosity at which the paste is easily applied onto the current collector.

(Negative Electrode Sheet)

The negative electrode sheet according to one embodiment of the present invention comprises a current collector and an electrode layer covering the current collector.

Specific examples of the current collector include nickel foil, copper foil, nickel mesh, copper mesh and the like.

The electrode layer comprises a binder and the negative electrode material described above. The electrode layer can be obtained by applying and drying the paste described above, for example. A method for applying the paste is not particularly limited. A thickness of the electrode layer is ordinarily 50 to 200 μm. If the thickness of the electrode layer is excessively large, the negative electrode sheet may be unable to be housed in a standardized battery container. The thickness of the electrode layer can be adjusted depending on the amount of paste applied. Moreover, the thickness can also be adjusted by pressure-forming after drying the paste. Specific examples of the pressure-forming method include a forming method such as roll pressing and plate pressing. A pressure applied upon the press-forming is preferably 1 to 5 ton/cm².

An electrode density of the negative electrode sheet can be calculated as described below. Specifically, a pressed negative electrode sheet is punched into a circular form having a diameter of 16 mm and weight thereof is measured. And a thickness of the electrode is measured. A weight and a thickness separately measured on the current collector can be subtracted therefrom to obtain the weight and the thickness of the electrode layer. And then the electrode density can be calculated based on the weight and the thickness of the electrode layer.

(Lithium Ion Battery)

The lithium ion battery according to one embodiment of the present invention has at least one selected from the group consisting of a non-aqueous electrolytic solution and a non-aqueous polymer electrolyte, a positive electrode sheet, and the negative electrode sheet described above.

As the positive electrode sheet used in the present invention, a sheet which has been so far used in lithium ion batteries, and specifically a sheet comprising a positive electrode active material can be used. Specific examples of the positive electrode active material include $LiNiO_2$, $LiCoO_2$, $LiMn_2O_4$, $LiNi_{0.34}Mn_{0.33}Co_{0.33}O_2$, $LiFePO_4$ and the like.

The non-aqueous electrolytic solution and the non-aqueous polymer electrolyte used in the lithium ion battery are not particularly limited. Specific examples thereof include an organic electrolytic solution obtained by dissolving lithium salt such as $LiClO_4$, $LiPF_6$, $LiAsF_6$, $LiBF_4$, $LiSO_3CF_3$, $CH_3SO_3Li$, $CF_3SO_3Li$ or the like into a non-aqueous solvent such as ethylene carbonate, diethyl carbonate, dimethyl carbonate, ethyl methyl carbonate, propylene carbonate, butylene carbonate, acetonitrile, propionitrile, dimethoxyethane, tetrahydrofuran, γ-butyrolactone or the like; a gel polymer electrolyte comprising polyethylene oxide, polyacrylonitrile, polyvinylidene fluoride, polymethyl methacrylate or the like; and a solid polymer electrolyte comprising a polymer having an ethylene oxide bond.

Moreover, a small amount of material which causes a decomposition reaction during initial charge of the lithium ion battery may be added to the electrolytic solution. Specific examples of the material include vinylene carbonate (VC), biphenyl, propane sultone (PS), fluoroethylene carbonate (FEC), ethylene sultone (ES) or the like. The additive amount thereof is preferably not less than 0.01% by mass and not more than 50% by mass.

In the lithium ion battery of the present invention, a separator can be placed between the positive electrode sheet and the negative electrode sheet. Specific examples of the separator include a nonwoven fabric, cloth, or a microporous film each primarily containing polyolefin such as polyethylene, polypropylene or the like, and a combination thereof.

The lithium ion battery of the present invention can be used as a power supply for an electronic device such as a mobile phone, a mobile personal computer, a mobile information terminal and the like; a power supply for an electric machinery such as an electric drill, an electric vacuum cleaner, an electric vehicle and the like; or storage of electric power obtained by a fuel cell, photovoltaic power generation, wind power generation and the like.

EXAMPLES

The present invention will be specifically described by way of Examples and Comparative Examples below, but the present invention is not limited to the Examples described below.

In the present Examples, various physical properties were measured by the following methods.

(Ratio of Areas of Si2p)

Measurement was carried out under conditions of an X-ray source of Al monochrome and a photoelectron take-off angle is 45° by applying X-ray photoelectron spectrometry (Quantera II) made by ULVAC-PHI, Inc. In bond energy correction, a C-C peak in a C1s spectrum was adjusted to 284.6 eV. From measured spectra, a ratio (A/B) of an area (A) of a peak near 100 eV to an area (B) of a peak near 103 eV was calculated.

(Oxygen Content)

About 10 mg of powder was weighed in a nickel capsule and an oxygen content was measured by an oxygen-nitrogen simultaneous analyzer (inert gas fusion-infrared absorption method).

(Specific Surface Area)

A specific surface area was measured by a multipoint BET method with relative pressures of 0.1, 0.2 and 0.3 by applying nitrogen gas as a probe by using Surface Area & Pore Size Analyzer NOVA 4200e made by Quantachrome Instruments Ltd.

(Particle Size)

To 50 mL of water, two micro spatulas of powder and two droplets of a non-ionic surfactant (TRITON (registered trademark)-X made by Roche Applied Science) were added, and the resultant mixture was subjected to ultrasonic dispersion for three minutes. The obtained dispersion liquid was charged into a laser diffraction particle size distribution measurement instrument (LMS-2000e) made by Seishin Enterprise Co. Ltd., and a volume-based cumulative particle size distribution was measured to determine a 10% diameter ($D_{10}$).

(Production of Positive Electrode Sheet)

An appropriate amount of N-methyl-pyrrolidone was added to 90 g of $LiCoO_2$, 5 g of carbon black (made by TIMCAL Ltd.) and 5 g of polyvinylidene fluoride (PVdF), while the resultant mixture was stirred and mixed to obtain a slurry paste for positive electrode. The paste for positive electrode was applied onto aluminum foil having a thickness of 20 μm using a roll coater and was dried. Next, the resultant material was pressed between pressure rolls to obtain a positive electrode sheet having an electrode density of 3.6 g/cm³.

(Production of Negative Electrode Sheet)

White powder of polyacrylic acid (PAA) was dissolved into purified water to obtain a PAA solution. White powder of carboxymethyl cellulose (CMC) was mixed with purified water, and the resultant mixture was stirred by a stirrer one whole day and night to obtain a CMC solution.

Then, 30 parts by mass of carbon black (made by TIMCAL Ltd.) and 20 parts by mass of vapor grown carbon fiber (VGCF (registered trademark)-H, made by Showa Denko K.K.) were mixed to obtain a mixed conductive assistant.

Then, 90 parts by mass of a composite material each produced in Examples and Comparative Examples, 5 parts by mass of the mixed conductive assistant, the CMC solution in an amount corresponding to 2.5 parts by mass of CMC, and the PAA solution in an amount corresponding to 2.5 parts by mass of PAA were mixed, an appropriate amount of water for adjusting viscosity was added thereto, and the resultant mixture was kneaded by planetary centrifugal mixer to obtain a paste for negative electrode. The paste for negative electrode was uniformly applied onto copper foil having a thickness of 20 μm using a doctor blade, was dried on a hot plate, and then was dried in vacuum. The resultant material was pressed at a pressure of 3 ton/cm² by a uniaxial presswork machine to obtain a negative electrode sheet.

(Initial Efficiency, Discharge Capacity, and Charge and Discharge Efficiency)

The negative electrode sheet was punched into a circular shape having a diameter of 16 mmΦ to prepare a half cell comprising a counter electrode composed of Li. Charge and discharge of the half cell were repeated under conditions described below.

First, constant current charge was performed at 0.1 C. From a time point when voltage reached 5 mV, constant voltage charge was performed. The charge was stopped at a time point when the current reached 0.005 C.

Next, constant current discharge was performed at 0.1 C. The discharge was stopped at a voltage of 1.5 V.

The charge and discharge operation was taken as one cycle, and performed in ten cycles.

Charge and discharge efficiency at a $10^{th}$ cycle was defined by the formula described below, and calculated.

(Charge and discharge efficiency (%) at $10^{th}$ cycle)= (discharge capacity at $10^{th}$ cycle)/(charge capacity at $10^{th}$ cycle)×100

(Discharge Capacity Retention Rate)

Based on the results in the half cell test described above, a thickness of the paste for the negative electrode was modulated so that a ratio of capacity ($Q_A$) of the negative electrode sheet to capacity ($Q_C$) of the positive electrode sheet was 1.2.

The operation described below was carried out in a glove box kept in an atmosphere of dry argon gas having a dew point of −80° C. or lower.

The negative electrode sheet and the positive electrode sheet which were finely tuned were punched, respectively, to obtain a negative electrode piece and a positive electrode piece each having an area of 20 cm². An Al tab was attached to the Al foil in the positive electrode piece and an Ni tab was attached to the Cu foil in the negative electrode piece, respectively. A microporous film made of polypropylene was interposed between the negative electrode piece and the positive electrode piece, and the resultant material in the sandwiched state was packed into an aluminum laminate. Then, an electrolytic solution was poured thereinto. Then, an opening portion was sealed by thermal fusion to prepare a full cell. In addition, the electrolytic solution was a solution obtained by mixing 1% by mass of vinylene carbonate (VC) and 30% by mass of fluoroethylene carbonate (FEC) with a solvent in which ethylene carbonate, ethyl methyl carbonate, and diethyl carbonate were mixed at a volume ratio of 3:5:2, and further dissolving electrolyte $LiPF_6$ at a concentration of 1 mol/L thereinto.

First, constant current charge and discharge were repeated on the full cell five times under conditions described below. Constant current charge was performed at 0.2 C. From a time point when voltage reached 4.2 V, constant voltage charge was performed. The charge was stopped at a time point when the current reached 0.05 C. And, constant current discharge was performed at 0.2 C. The discharge was stopped at a voltage of 2.8 V.

Then, charge and discharge were performed on the full cell under conditions described below. Constant current charge was performed at 1 C. From a time point when voltage reached 4.2 V, constant voltage charge was performed. The charge was stopped at a time point when the current reached 0.05 C. And, constant current discharge was performed at 1 C. The discharge was stopped at a voltage of 2.8 V. The charge and discharge operation was taken as one cycle, performed in 100 cycles, and discharge capacity retention at a $100^{th}$ cycle was defined by the formula described below, and calculated.

(Discharge capacity retention rate (%) at 100th cycle)=(discharge capacity at $100^{th}$ cycle)/ (discharge capacity at first cycle)×100

Example 1

Petroleum coke was milled, and the resultant material was subjected to heat treatment at 3000° C. in an Acheson furnace to obtain scale-like graphitic carbon material particles having a 10% particle diameter ($D_{10}$) of 7.8 μm and a BET specific surface area of 1.9 m²/g.

Into a separable flask, 10 parts by mass of silicon-containing particles ($D_{av}$: 50 nm; oxygen content: 5.8% by mass; true density (theoretical value): 2.33 g/cm³) and 20 parts by mass of petroleum pitch (softening point: 93° C.; actual carbon ratio: 28%) {in terms of mass of carbonized petroleum pitch} were charged. An inert atmosphere was kept by flowing nitrogen gas, and temperature was increased to 150° C. Disper was rotated at 1000 rpm for stirring and uniformly mixing the pitch and the silicon-containing particles. The resultant material was cooled, and solidified to obtain a mixture (a).

The mixture (a) was milled by a rod mill in a nitrogen atmosphere to obtain a milled product (a).

Into a rotary cutter mill, 50 parts by mass of the milled product (a) and 50 parts by mass of graphitic carbon material particles were charged, and were stirred and mixed with high speed at 25,000 rpm, while an inert atmosphere was kept by flowing nitrogen gas.

The resultant mixture was put in a firing furnace, temperature was increased to 1100° C. at 150° C./h and held at 1100° C. for one hour under flow of nitrogen gas. The fired product was cooled to room temperature, removed from the firing furnace, disintegrated and classified by a sieve having an opening of 45 μm to obtain a composite material (a) as an undersize product.

For the composite material (a), a ratio (A/B) of areas of XPS-Si2p peaks, an oxygen content, a specific surface area, and $D_{10}$ were measured. Moreover, a half cell and a full cell were prepared using the composite material (a), and initial efficiency, charge and discharge efficiency, discharge capacity, and discharge capacity retention rate were measured. The results are shown in Table 1.

Example 2

A composite material (b) was obtained in the same manner as in Example 1 except that a rotary cutter mill was used in place of the rod mill for milling the mixture (a).

For the composite material (b), a ratio (A/B) of areas of XPS-Si2p peaks, an oxygen content, a specific surface area, and $D_{10}$ were measured. Moreover, a half cell and a full cell were prepared using the composite material (b), and initial efficiency, charge and discharge efficiency, discharge capacity, and discharge capacity retention rate were measured. The results are shown in Table 1.

Example 3

A composite material (c) was obtained in the same manner as in Example 1 except that the milled product (a) and the graphitic carbon material particles were milled by a rod mill in place of the rotary cutter mill.

For the composite material (c), a ratio (A/B) of areas of XPS-Si2p peaks, an oxygen content, a specific surface area, and $D_{10}$ were measured. Moreover, a half cell and a full cell were prepared using the composite material (c), and initial efficiency, charge and discharge efficiency, discharge capacity, and discharge capacity retention rate were measured. The results are shown in Table 1.

Example 4

The mixture (a) obtained in the same manner as in Example 1 was milled using a rotary cutter mill to obtain a milled product (d).

Into a rod mill, 50 parts by mass of the milled product (d) and 50 parts by mass of graphitic carbon material particles were charged, and were mixed in a nitrogen atmosphere. The resultant mixture was put in a firing furnace, temperature was increased 1100° C. at 150° C./h and held at 1100° C. for one hour under flow of nitrogen gas. The fired product was cooled to room temperature, removed from the firing furnace, disintegrated, and classified by a sieve having an opening of 45 μm to obtain a composite material (d) as an undersize product.

For the composite material (d), a ratio (A/B) of areas of XPS-Si2p peaks, an oxygen content, a specific surface area, and $D_{10}$ were measured. Moreover, a half cell and a full cell were prepared using the composite material (d), and initial efficiency, charge and discharge efficiency, discharge capacity, and discharge capacity retention rate were measured. The results are shown in Table 1.

Example 5

Into a separable flask, 10 parts by mass of silicon-containing particles ($D_{av}$: 50 nm; oxygen content 5.8% by mass; true density (theoretical value): 2.33 g/cm³) and 6 parts by mass of petroleum pitch (softening point: 220° C.; actual carbon ratio: 53%) {in terms of mass of carbonized petroleum pitch} were charged. An inert atmosphere was kept by flowing nitrogen gas, temperature was increased to 250° C. Disper was rotated at 500 rpm for stirring and uniformly mixing the pitch and the silicon-containing particles. The resultant material was cooled, and solidified to obtain a mixture (e).

The mixture (e) was milled using a rotary cutter mill in a nitrogen atmosphere to obtain a milled product (e).

Into a rotary cutter mill, 10 parts by mass of the milled product (e) and 30 parts by mass of graphitic carbon material particles were charged, and were stirred and mixed with high speed at 25,000 rpm, while an inert atmosphere was kept by flowing nitrogen gas.

The resultant mixture was put in a firing furnace, temperature was increased to 1100° C. at 150° C./h and held at 1100° C. for one hour under flow of nitrogen gas. The fired product was cooled to room temperature, removed from the firing furnace, disintegrated, and classified by 45 μm sieve to obtain a composite material (e) as an undersize product.

For the composite material (e), a ratio (A/B) of areas of XPS-Si2p peaks, an oxygen content, a specific surface area, and $D_{10}$ were measured. Moreover, a half cell and a full cell were prepared using the composite material (e), and initial efficiency, charge and discharge efficiency, discharge capacity, and discharge capacity retention rate were measured. The results are shown in Table 1.

Example 6

A mixture (f) was obtained by dry-mixing 10 parts by mass of silicon-containing particles ($D_{av}$: 50 nm; oxygen content: 5.8% by mass; true density (theoretical value): 2.33 g/cm³) and 6 parts by mass of petroleum pitch (softening point: 220° C.; actual carbon ratio: 53%) (in terms of mass of carbonized petroleum pitch) using a planetary ball mill in which zirconia balls having a diameter of 3 mm were put and nitrogen gas was introduced.

The mixture (f) was milled using a rotary cutter mill in a nitrogen atmosphere to obtain a milled product (f).

Into a rotary cutter mill, 10 parts by mass of the milled product (f) and 30 parts by mass of graphitic carbon material particles were charged, and were stirred and mixed with high speed at 25,000 rpm, while an inert atmosphere was kept by flowing nitrogen gas.

The resultant material was put in a firing furnace, temperature was increased to 1100° C. at 150° C./h and held at 1100° C. for one hour under flow of nitrogen gas. The fired product was cooled to room temperature, removed from the firing furnace, disintegrated, and classified by a sieve having an opening of 45 μm to obtain a composite material (f) as an undersize product.

For the composite material (f), a ratio (A/B) of areas of XPS-Si2p peaks, an oxygen content, a specific surface area, and $D_{10}$ were measured. Moreover, a half cell and a full cell were prepared using the composite material (f), and initial efficiency, charge and discharge efficiency, discharge capacity, and discharge capacity retention rate were measured. The results are shown in Table 1.

Comparative Example 1

Into a rotary cutter mill, 10 parts by mass of the milled product (e) obtained in the same manner as in Example 5 and 30 parts by mass of graphitic carbon material particles were charged, and were stirred and mixed with high speed at 25,000 rpm, while an inert atmosphere was kept by flowing nitrogen gas. And the resultant material was put in a firing furnace, temperature was increased to 220° C. at 120° C./h and held at 220° C. for one hour under air flow to oxidize the pitch. Then, temperature was increased to 1100° C. at 150° C./h and held at 1100° C. for one hour under flow of nitrogen gas. The fired product was cooled to room temperature, removed from the baking furnace, disintegrated, and classified by a sieve having an opening of 45 μm to obtain a composite material (g) as an undersize product.

For the composite material (g), a ratio (A/B) of areas of XPS-Si2p peaks, an oxygen content, a specific surface area, and $D_{10}$ were measured. Moreover, a half cell and a full cell were prepared using the composite material (g), and initial efficiency, charge and discharge efficiency, discharge capacity, and discharge capacity retention rate were measured. The results are shown in Table 1.

Comparative Example 2

Into a separable flask, 10 parts by mass of silicon-containing particles ($D_{av}$: 50 nm; oxygen content: 5.8% by mass; true density (theoretical value): 2.33 g/cm³) and 20 parts by mass of petroleum pitch (softening point: 165° C.; actual carbon ratio: 49%) (in terms of mass of carbonized petroleum pitch) were charged. An inert atmosphere was kept by flowing nitrogen gas, temperature was increased to 200° C. Disper was rotated at 1000 rpm for stirring and uniformly mixing the pitch and the silicon-containing particles. The resultant material was cooled, and solidified to obtain a mixture (h).

To 20 parts by mass of purified water, 20 parts by mass of the mixture (h) was added, the resultant material was subject to wet milling by a rod mill, and dried to obtain a milled product (h).

In 80 parts by mass of purified water, 50 parts by mass of the milled product (h) and 50 parts by mass of graphitic carbon material particles were added, and the resultant material were subjected to wet milling by a rod mill and then were dried. The resultant material was put in a firing furnace, temperature was increased to 1110° C. at 150° C./h and held at 1100° C. for one hour under flow of nitrogen gas. The fired product was cooled to room temperature, removed from the firing furnace, disintegrated, and classified by a sieve having an opening of 45 μm to obtain a composite material (h) as an undersize product.

For the composite material (h), a ratio (A/B) of areas of XPS-Si2p peaks, an oxygen content, a specific surface area, and $D_{10}$ were measured. Moreover, a half cell and a full cell were prepared using the composite material (h), and initial efficiency, charge and discharge efficiency, discharge capacity, and discharge capacity retention rate were measured. The results are shown in Table 1.

Comparative Example 3

A mixture (i) was obtained by dry-mixing 10 parts by mass of silicon-containing particles ($D_{av}$: 50 nm; oxygen content: 5.8% by mass; true density (theoretical value): 2.33 g/cm$^3$) and 84 parts by mass of graphitic carbon material particles using a planetary ball mill in which zirconia balls having a diameter of 3 mm were put and nitrogen gas was introduced.

Next, 94 parts by mass of the mixture (i) and 6 parts by mass of petroleum pitch (softening point: 220° C.; actual carbon ratio 53%) (in terms of mass of carbonized petroleum pitch) were subjected to dry mixing using a planetary ball mill in which zirconia balls having a diameter of 3 mm were put and nitrogen gas was introduced. And the resultant material was put in a firing furnace, temperature was increased to 1100° C. at 150° C./h and held at 1100° C. for one hour under flow of nitrogen gas. The fired product was cooled to room temperature, removed from the firing furnace, disintegrated, and classified by a sieve having an opening of 45 μm to obtain a composite material (i) as an undersize product.

For the composite material (i), a ratio (A/B) of areas of XPS-Si2p peaks, an oxygen content, a specific surface area, and $D_{10}$ were measured. Moreover, a half cell and a full cell were prepared using the composite material (i), and initial efficiency, charge and discharge efficiency, discharge capacity, and discharge capacity retention rate were measured. The results are shown in Table 1.

Comparative Example 4

A mixture (j) was obtained by dry-mixing 6 parts by mass of petroleum pitch (softening point: 220° C.; actual carbon ratio 53%) (in terms of mass of carbonized petroleum pitch) and 84 parts by mass of graphitic carbon material particles using a planetary ball mill in which zirconia balls having a diameter of 3 mm were put and nitrogen gas was introduced.

Next, 90 parts by mass of the mixture (j) and 10 parts by mass of silicon-containing particles ($D_{av}$: 50 nm; oxygen content: 5.8% by mass; true density (theoretical value): 2.33 g/cm$^3$) were subjected to dry mixing using a planetary ball mill in which zirconia balls having a diameter of 3 mm were put and nitrogen gas was introduced. And the resultant material was put in a firing furnace, temperature was increased to 1100° C. at 150° C./h and held at 1100° C. for one hour under flow of nitrogen gas. The fired product was cooled to room temperature, removed from the firing furnace, disintegrated, and classified by a sieve having an opening of 45 μm to obtain a composite material (j) as an undersize product.

For the composite material (j), a ratio (A/B) of areas of XPS-Si2p peaks, an oxygen content, a specific surface area, and $D_{10}$ were measured. Moreover, a half cell and a full cell were prepared using the composite material (j), and initial efficiency, charge and discharge efficiency, discharge capacity, and discharge capacity retention rate were measured. The results are shown in Table 1.

Comparative Example 5

Into a rotary cutter mill, 30 parts by mass of petroleum pitch (softening point: 220° C.; actual carbon ratio 53%) (in terms of mass of carbonized petroleum pitch), 60 parts by mass of graphitic carbon material particles, and 10 parts by mass of silicon-containing particles ($D_{av}$: 50 nm; oxygen content: 5.8% by mass; true density (theoretical value): 2.33 g/cm$^3$) were charged and were stirred with high speed at 25,000 rpm to obtain a mixture (k), while an inert atmosphere was kept by flowing nitrogen gas.

The mixture (k) was put in a firing furnace, temperature was increased to 1100° C. at 150° C./h and held at 1100° C. for one hour under flow of nitrogen gas. The fired product was cooled to room temperature, removed from the firing furnace, disintegrated, and classified by a sieve having an opening of 45 μm to obtain a composite material (k) as an undersize product.

For the composite material (k), a ratio (A/B) of areas of XPS-Si2p peaks, an oxygen content, a specific surface area, and $D_{10}$ were measured. Moreover, a half cell and a full cell were prepared using the composite material (k), and initial efficiency, charge and discharge efficiency, discharge capacity, and discharge capacity retention rate were measured. The results are shown in Table 1.

Comparative Example 6

Commercially available silicon-containing particles ($D_{av}$: 20 μm) were milled using a planetary ball mill in which zirconia balls having a diameter of 0.3 mm was used, and ethanol was used as a dispersant.

Into a separable flask, 10 parts by mass of the milled silicon-containing particles ($D_{av}$: 1.9 μm; oxygen content: 20% by mass; true density (theoretical value): 2.33 g/cm$^3$) and 6 parts by mass of petroleum pitch (softening point: 220° C.; actual carbon ratio 53%) (in terms of mass of carbonized petroleum pitch) were charged. An inert atmosphere was kept by flowing nitrogen gas, and temperature was increased to 250° C. Disper was rotated at 500 rpm for stirring and uniformly mixing the pitch and the silicon-containing particles. The resultant material was cooled, and solidified to obtain a mixture (l).

The mixture (l) was milled using a rotary cutter mill in a nitrogen atmosphere to obtain a milled product (l).

Into a rotary cutter mill, 10 parts by mass of the milled product (l) and 30 parts by mass of graphitic carbon material particles were charged, and were stirred and mixed with high speed at 25,000 rpm, while an inert atmosphere was kept by flowing nitrogen gas.

The resultant material was put in a firing furnace, temperature was increased to 1100° C. at 150° C./h and held at 1100° C. for one hour under flow of nitrogen gas. The fired product was cooled to room temperature, removed from the firing furnace, disintegrated, and classified by a sieve having an opening of 45 μm to obtain a composite material (1) as an undersize product.

For the composite material (1), a ratio (A/B) of areas of XPS-Si2p peaks, an oxygen content, a specific surface area, and $D_{10}$ were measured. Moreover, a half cell and a full cell were prepared using the composite material (1), and initial efficiency, charge and discharge efficiency, discharge capacity, and discharge capacity retention rate were measured. The results are shown in Table 1.

[Table 1]

TABLE 1

|  | A/B [-] | Oxygen content [%] | Specific surface area [m²/g] | $D_{10}$ [μm] | Initial efficiency [%] | Half cell 10th cycle Discharge capacity [mAh/g] | 10th cycle Charge and Discharge efficiency [%] | Full cell 100th cycle Discharge capacity retention [%] |
|---|---|---|---|---|---|---|---|---|
| Ex. 1 | 0.92 | 0.7 | 9.2 | 3.3 | 87.8 | 586 | 99.4 | 74.6 |
| Ex. 2 | 0.67 | 1.3 | 9.7 | 2.6 | 87.0 | 585 | 99.2 | 69.6 |
| Ex. 3 | 0.67 | 0.9 | 9.4 | 3.1 | 85.8 | 584 | 98.9 | 71.1 |
| Ex. 4 | 0.15 | 1.6 | 11.2 | 3.1 | 84.4 | 571 | 99.0 | 68.5 |
| Ex. 5 | 0.14 | 0.9 | 5.6 | 3.4 | 90.5 | 580 | 99.0 | 72.1 |
| Ex. 6 | 1.28 | 1.8 | 4.6 | 2.2 | 88.9 | 568 | 98.6 | 65.3 |
| Comp. Ex. 1 | 0.07 | 1.1 | 2.0 | 5.5 | 88.2 | 530 | 98.0 | 45.3 |
| Comp. Ex. 2 | 0.02 | 6.2 | 23.4 | 2.4 | 77.6 | 458 | 98.8 | 77.5 |
| Comp. Ex. 3 | 3.17 | 1.3 | 4.0 | 4.8 | 87.7 | 541 | 98.1 | 48.1 |
| Comp. Ex. 4 | 2.33 | 1.1 | 4.0 | 5.8 | 88.4 | 549 | 98.1 | 46.4 |
| Comp. Ex. 5 | 0.08 | 1.4 | 15.8 | 1.3 | 83.2 | 403 | 98.7 | 61.9 |
| Comp. Ex. 6 | 0.01 | 3.1 | 5.9 | 3.2 | 79.6 | 552 | 98.0 | 49.7 |

From the results described above, it is found that, using of the negative electrode material according to the present invention can provide a lithium ion battery having a good balance of initial efficiency, the discharge capacity at the $10^{th}$ cycle and the discharge amount retention rate at the $100^{th}$ cycle, large capacity, and excellent charge and discharge cycle characteristics.

The invention claimed is:

1. A negative electrode material for lithium ion battery, the negative electrode material comprising a composite material,
wherein the composite material comprises silicon-containing particles, graphitic carbon material particles, and a carbonaceous carbon material and has a ratio (A/B) of an area (A) of a peak near 100 eV derived from Si metal to an area (B) of a peak near 103 eV derived from silicon oxide, as measured by X-ray photoelectron spectroscopy, of not less than 0.10 and not more than 2.30.

2. The negative electrode material for lithium ion battery according to claim 1, wherein an oxygen content of the composite material is not more than 3% by mass.

3. The negative electrode material for lithium ion battery according to claim 1, wherein a BET specific surface area of the composite material is not less than 2 m²/g and not more than 22 m²/g.

4. The negative electrode material for lithium ion battery according to claim 1, wherein a 10% diameter ($D_{10}$) in a volume-based cumulative particle size distribution of the composite material, as measured by a laser diffraction method, is not less than 2.0 μm.

5. The negative electrode material for lithium ion battery according to claim 1, wherein the silicon-containing particles comprise a surface layer comprising $SiO_x$ (0<x≤2), and has a 90% diameter ($D_{90}$) of not more than 200 nm in a number-based cumulative primary particle size distribution.

6. The negative electrode material for lithium ion battery according to claim 1, wherein an amount of the silicon-containing particles is not less than 5 parts by mass and not more than 35 parts by mass relative to 100 parts by mass of the graphitic carbon material particles.

7. The negative electrode material for lithium ion battery according to claim 1, wherein an oxygen content of the silicon-containing particles is not less than 1% by mass and not more than 18% by mass.

8. The negative electrode material for lithium ion battery according to claim 1, wherein the graphitic carbon material particles are composed of artificial graphite.

9. The negative electrode material for lithium ion battery according to claim 1, wherein the graphitic carbon material particles are in a shape of a scale, and have an average interplanar distance ($d_{002}$) of [002] plane of not more than 0.337 nm and a crystallite size (Lc) of not less than 50 nm and not more than 1000 nm as calculated by analysis of an X-ray diffraction pattern with CuKα radiation.

10. The negative electrode material for lithium ion battery according to claim 1, wherein the carbonaceous carbon material comprises a heat-treated product of petroleum pitch or coal pitch.

11. The negative electrode material for lithium ion battery according to claim 10, wherein the petroleum pitch or the coal pitch has a softening point of 80° C. to 300° C.

12. The negative electrode material for lithium ion battery according to claim 1, wherein an amount of the carbonaceous carbon material is not less than 2% by mass and not more than 40% by mass relative to mass of the composite material.

13. A paste, comprising the negative electrode material for lithium ion battery according to claim 1, and a binder.

14. A negative electrode for lithium ion battery, comprising a formed body of the paste according to claim 13.

15. A lithium ion battery, comprising the negative electrode according to claim 14.

* * * * *